(12) United States Patent
Chen et al.

(10) Patent No.: US 8,892,711 B2
(45) Date of Patent: Nov. 18, 2014

(54) METHOD FOR ACQUIRING NODE INFORMATION, AND CLIENT AND SERVER

(75) Inventors: Bo Chen, Shenzhen (CN); Fei Ju, Shenzhen (CN); Lei Yuan, Shenzhen (CN); Tao Zhou, Shenzhen (CN); Hanling Yang, Shenzhen (CN); Jian Shen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 490 days.

(21) Appl. No.: 13/259,178

(22) PCT Filed: Apr. 20, 2010

(86) PCT No.: PCT/CN2010/071937
§ 371 (c)(1),
(2), (4) Date: Oct. 7, 2011

(87) PCT Pub. No.: WO2010/124571
PCT Pub. Date: Apr. 11, 2010

(65) Prior Publication Data
US 2012/0023216 A1    Jan. 26, 2012

(30) Foreign Application Priority Data

Apr. 30, 2009    (CN) .......................... 2009 1 0138532

(51) Int. Cl.
| | |
|---|---|
| *G06F 15/173* | (2006.01) |
| *H04W 8/20* | (2009.01) |
| *H04W 28/06* | (2009.01) |
| *H04W 28/04* | (2009.01) |

(52) U.S. Cl.
CPC ................ *H04W 8/20* (2013.01); *H04W 28/06* (2013.01); *H04W 28/04* (2013.01)
USPC ............ 709/223; 709/224; 709/225; 709/226

(58) Field of Classification Search
None
See application file for complete search history.

(56) References Cited

U.S. PATENT DOCUMENTS

| | | | |
|---|---|---|---|
| 6,330,238 B1 | 12/2001 | Ooe | |
| 6,691,165 B1 * | 2/2004 | Bruck et al. | ................... 709/227 |

(Continued)

FOREIGN PATENT DOCUMENTS

| | | |
|---|---|---|
| CN | 1625865 A | 6/2005 |
| CN | 1852138 A | 10/2006 |

(Continued)

OTHER PUBLICATIONS

English Translation of PCT International Preliminary Report on Patentability, including (1) Notification Concerning Transmittal of International Preliminary Report on Patentability and (2) Written Opinion of the International Searching Authority, for PCT/CN2010/071937, mailed Nov. 10, 2011 (6 pages).

(Continued)

*Primary Examiner* — Brian P Whipple
(74) *Attorney, Agent, or Firm* — Clark & Elbing LLP

(57) ABSTRACT

The present invention discloses a method for acquiring node information, and a Client and a server, wherein the method includes: a Client receiving a Get command sent from a server, acquiring values of nodes in all items in the Get command, and determining that acquirement of values of nodes in partial items fails; and the Client sending to the server a response message which carries a new status value, wherein the new status value is adapted to indicate that acquirement of values of nodes in partial items fails when a Get command is executed, and the response message also carries a predetermined tag, wherein the predetermined tag is adapted to packet information of nodes in items in which acquirement of values is successful. By the above technical solution of the present invention, useful nodes can be acquired more effectively, nodes which can not be acquired can be located.

10 Claims, 5 Drawing Sheets

(56) References Cited

U.S. PATENT DOCUMENTS

| | | | |
|---|---|---|---|
| 6,985,921 B2 * | 1/2006 | Covelli et al. | 709/203 |
| 7,269,821 B2 | 9/2007 | Sahinoja et al. | |
| 7,343,418 B2 | 3/2008 | Herley | |
| 2002/0107978 A1 * | 8/2002 | Covelli et al. | 709/238 |
| 2003/0204640 A1 | 10/2003 | Sahinoja et al. | |

FOREIGN PATENT DOCUMENTS

| | | |
|---|---|---|
| CN | 101282348 A | 10/2008 |
| EP | 0921655 A2 | 6/1999 |

OTHER PUBLICATIONS

English Translation of PCT International Search Report for PCT/CN2010/071937, mailed Jul. 29, 2010 (3 pages).

* cited by examiner

| Status Value | Explanation |
|---|---|
| 200 | Command is executed successfully |
| 215 | Command can not be executed |
| 401 | No authorization |
| 404 | Data can not be found |
| 405 | Command can not be executed (no authority for execution) |
| 406 | URL does not support |
| 407 | Authentification required |
| 413 | Data too large |
| 414 | URL too long |
| 415 | Media type is not supported |
| 425 | Operation is prohibited |
| 500 | Command executes unsuccessfully |

Fig. 1

METHOD FOR ACQUIRING NODE INFORMATION, AND CLIENT AND SERVER

CROSS-REFERENCE TO RELATED APPLICATIONS

This application is in the U.S. National Stage filing under 35 U.S.C. §371 of International Application No. PCT/CN2010/071937, filed Apr. 20, 2010, which claims benefit of Chinese Patent Application No. 200910138532.0, filed Apr. 30, 2009.

FIELD OF THE INVENTION

The present invention relates to the communication field, and in particular to a method for acquiring node information, and a client and a server, which are adapted to the OMA DM protocol.

BACKGROUND OF THE INVENTION

In the related art, the Open Mobile Alliance Device Management (OMA DM for short) services are value-added services of mobile data based on related standards of OMA information Synchronization Mark up Language (SyncML for short) DM, which help operators achieve the capability of remotely managing mobile terminals through a wireless manner. A Device Management (DM for short) Client operating in a mobile phone is required to perform interactions with a server as specified in a protocol, to fulfill SyncML DM functions, wherein such functions include the device information management, the gathering and matching of parameters, the terminal software/firmware upgrade and etc.

The OMA DM protocol is an application protocol belonging to the OMA SynML protocol. In the OMA DM protocol, sessions complete various device management functions by means of sending various commands and acquiring terminal responses. The commands supported by the OMA DM protocol include many commands such as Get, Add, Replace, Exec (execute), Delete, and etc., and such supported commands are subsets of the OMA SyncML protocol.

As for each command, a series of status values are defined in the OMA DM protocol, so as to define definitely execution results of the commands in the sessions. The status values of the commands are defined in the protocol document named "OMA-TS-DM_RepPro-V1_2-20070209-A.pdf". FIG. 1 is a schematic diagram of definitions of return values of a Get command of an OMA SyncML DM protocol terminal in the related art. As illustrated in FIG. 1, in the OMA SyncML DM protocol, the return values defined for the Get command comprise twelve values, including 200 (the command being executed successfully, OK), 215 (the command being not executed, Not Executed), 401 (Unauthorized), 404 (Not Found), 405 (the command being not allowed to execute, Command Not Allowed) and etc. These status values define definitely most results possibly occurring during an execution process of the Get command, for example, command being executed successfully, nodes being not found, being unauthorized, no authentification, operation being not supported, command being failed, Uniform Resource Identifier (URI for short) being too long, and etc.

In practical application, there may be a process manner in which an execution result of the Get command in the protocol has not been defined definitely, namely, performing acquirement operation on plural nodes (URI) through plural Items in the same Get command. Since the protocol has not definitely prescribed the process manner of the above mentioned case, it can be dealt with according to the following manners when it occurs in practical application.

1. If all URIs are acquired successfully, the status code 200 is returned for indicating success, and each acquired value is listed in a Result tag.

2. If the acquirement of URIs of one or more Items fails, the Get command returns "failure", wherein the failure status code is the same as the failed URI. Furthermore, there is no Result tag to feed back the part of the nodes which are acquired successfully.

Hereinafter, the above process manners will be described by examples. In this example, synchronic packet header information is not listed completely, which however does not affect the explanation of the problem in the example. As illustrated in the following, a server sends a Get command containing plural Items in a certain phase after a session begins.

```
<SyncML>
  <SyncHdr>
    <VerDTD>1.2</VerDTD>
    <VerProto>DM/1.2</VerProto>
    <SessionID>8155</SessionID>
    <MsgID>1</MsgID>
    ......omitted
  </SyncHdr>
  <SyncBody>
    <Get>
      <CmdID>1</CmdID>
      <Item>
        <Target>
          <LocURI>./DevInfo/Lang</LocURI>
        </Target>
      </Item>
      <Item>
        <Target>
          <LocURI>./DevInfo/Man</LocURI>
        </Target>
      </Item>
      <Item>
        <Target>
          <LocURI>./DMAcc/AppAuth/Client/AAuthSecret</LocURI>
        </Target>
      </Item>
    </Get>
    <Final />
  </SyncBody>
</SyncML>
```

All the URIs that the above Get command intends to acquire are standard nodes specified in the DM protocol. In a Client, there is no authorization to acquire nodes specified in some Items. For example, as illustrated in FIG. 2, as for the /DMAcc/AppAuth/Client/AauthSecret node which is the password fields of authentication data, a server has only Replace authority rather than Get authority, that is to say, the case that some Items among plural Items are not authorized to acquire exists.

After receiving the above mentioned Get command, the Client executes an acquirement operation, and the execution fails in the third Item resulting from no authority, and the whole Get command returns a command 425 (No Authority, operation being refused). It should be noted that the realization of different Clients are different, so that other statuses indicating errors (such as 405) can also be returned. As shown in the following:

```
<SyncML xmlns="SYNCML: SYNCML1.2">
  <SyncHdr>
    <VerDTD>1.2</VerDTD>
```

```
<VerProto>DM/1.2</VerProto>
<SessionID>8155</SessionID>
<MsgID>1</MsgID>
......omitted
</SyncHdr>
<SyncBody>
<Status>
    <CmdID>1</CmdID>
    <MsgRef>1</MsgRef>
    <CmdRef>1</CmdRef>
    <Cmd>Get</Cmd>
    <Data>405</Data>
</Status>
    <Final />
    </SyncBody>
</SyncML>
```

As mentioned above, the server is required to acquire information of three nodes, and actually the terminal has already acquired the information of two nodes thereof, but the acquirement of the third node fails. In the case that the acquirement of the information of most nodes is successful, the server only receives the indication indicating the execution of the Get command fails, and thus maximum amount of information has not been acquired. Such process wastes the process capability of the Client, and meanwhile also wastes network resources. Furthermore, if the server has no appropriate retry strategy (e.g. dividing the Get command to separately acquire), the required information can not be acquired comprehensively.

SUMMARY OF THE INVENTION

In consideration of the problem in the related art that rest acquired effective information can not take effect when one or more Items in a Get command fails, the present invention is put forward. Thus, one main aspect of the present invention is to provide a method for acquiring node information, and a Client and a server, so as to solve the above mentioned problem in the related art.

To achieve the above aspect, according to one aspect of the present invention, a method for acquiring node information, which is adapted to optimize a Get command containing plural items in a device management protocol, is provided.

The method for acquiring node information comprises: a Client receiving the Get command sent from a server, acquiring values of nodes in all items in the Get command, and determining that acquirement of values of nodes in partial items fails; and the Client sending to the server a response message which carries a new status value, wherein the new status value is adapted to indicate that acquirement of values of nodes in partial items fails when a Get command is executed, and the response message also carries a predetermined tag, wherein the predetermined tag is adapted to packet information of the nodes in items in which acquirement of values is successful.

Preferably, before the step of the Client receiving the Get command sent from the server, the method further comprises: setting the new status value for the Get command, wherein the new status value is adapted to indicate that the acquirement of the values of the nodes in partial items in the Get command fails.

Preferably, after the step of the Client receiving the Get command sent from the server, the method further comprises: the Client determining that plural items are contained in the Get command.

Preferably, after the step of the Client sending to the server the response message, the method further comprises: the server receiving the response message and determining that the response message carries the new status value; the server acquiring, from the predetermined tag, the information of nodes in the items in which the acquirement of the values is successful, and storing the information of nodes; and the server executing a predetermined operation for the nodes in the items in which the acquirement of the values fails.

Preferably, the predetermined operation comprises one of the following: giving up a session with the nodes in the items in which the acquirement of the values fails; and resending a Get command to acquire the values of the nodes in the items in which the acquirement of the values fails.

To achieve the above aspect, according to another aspect of the present invention, a client is provided to optimize a Get command containing plural items in a device management protocol.

The Client according to the present invention includes: a receiving module, adapted to receive the Get command sent from a server; an acquirement module, adapted to acquire values of nodes in all items in the Get command; a first determination module, adapted to determine that acquirement of values of nodes in partial items fails; and a sending module, adapted to send to the server a response message which carries a new status value indicating that acquirement of values of nodes in partial items fails when a Get command is executed, wherein the response message also carries a predetermined tag, wherein the predetermined tag is adapted to packet information of nodes in items in which acquirement of values is successful.

Preferably, the Client further comprises: a second determination module, adapted to determine that plural items are contained in the Get command.

To achieve the above aspect, according to still another aspect of the present invention, a server is provided to optimize a Get command containing plural items in a device management protocol.

The server according to the present invention includes: a sending module, adapted to send the Get command to a Client; and a receiving module, adapted to receive, from the Client, a response message which carries a new status value indicating that acquirement of values of nodes in partial items fails when a Get command is executed; wherein the response message also carries a predetermined tag, wherein the predetermined tag is adapted to packet information of nodes in items in which acquirement of values is successful.

Preferably, the server further includes: a determination module, adapted to determine that the response message carries the new status value; a storage module, adapted to acquire, according to the predetermined tag, the information of nodes in the items in which the acquirement of the values is successful, and store the information of nodes; and an execution module, adapted to execute a predetermined operation for the nodes in the items in which the acquirement of the values fails.

Preferably, the predetermined operation comprises one of the following: giving up a session with the nodes in the items in which the acquirement of the values fails; and resending a Get command to acquire the values of the nodes in the items in which the acquirement of the values fails.

In virtue of the technical solution of the present invention, when a Get command, containing plural Items, of the OMA SyncML DM is executed, the Client can notify the server through a special status value that the Get is not completely successful but partially successful, and that the values of the nodes which are successfully acquired are attached in a Result tag, so as to solve the problem in the related art that rest acquired effective information can not take effect when one or more Items in a Get command fails, therefore acquiring useful nodes more effectively, locating the nodes that can not be acquired, improving the effectiveness with which the client operates the Get command, and avoiding the case that network resources are wasted.

Other features and advantages of the present invention will be described in the following specification, and will partially be obvious from the specification, or be understood through carrying out the present invention. The purposes and other advantages of the present invention can be achieved and acquired through the structures specially indicated in the drawings, the specification, and the claims.

BRIEF DESCRIPTION OF THE DRAWINGS

FIG. 1 is a schematic diagram of definitions of return values of a Get command of an OMA SyncML DM protocol terminal in the related art;

DETAILED DESCRIPTION OF THE EMBODIMENTS

Figure 2:
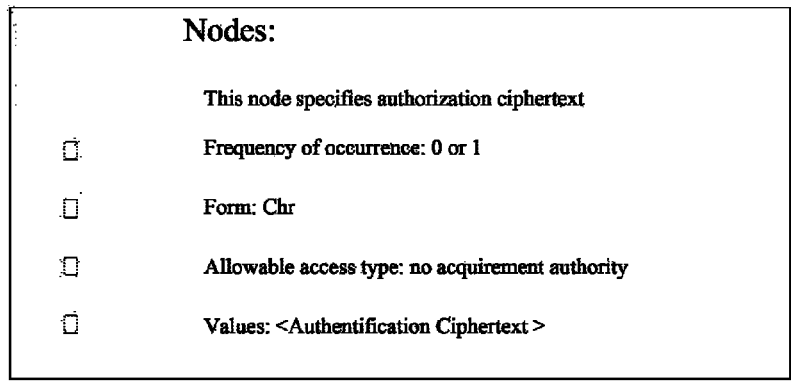
FIG. 2 is a schematic diagram of description of an Aauth-Secret node in the OMA SyncML DM protocol in the related art.

In the related art, there exists a problem that rest acquired effective information can not take effect when one or more Items of a Get command fails, therefore the present invention provides a method for optimizing a Get command in the OMA SyncML DM protocol. The method strengthens the process for the Get command in the protocol, and defines a new status value for the case that the Get operation of partial nodes in the plural items fails. Embodiments of the present invention also disclose a process method when a Client receives a Get command containing plural items, as well as a process method after a server receives a response from a client.

In the above, a method for acquiring node information includes: a Client receiving a Get command sent from a server, acquiring values of nodes in all items in the Get command, and determining that acquirement of values of nodes in partial items fails; and the Client sending to the server a response message which carries a new status value, wherein the new status value is adapted to indicate that acquirement of values of nodes in of the partial items fails when a Get command is executed, and the response message also carries a predetermined tag, wherein the predetermined tag is adapted to packet the information of the nodes in items in which acquirement of values is successful.

The preferred embodiments of the present invention will be described in combination with the drawings hereinafter. It should be understood that the preferred embodiments described herein are just used for describing and explaining the present invention rather than limiting the present invention.

In the following description, for the purpose of explanation, many specific details are described to provide a thorough understanding of the present invention. However, it is obvious that the present invention can also be achieved even without such specific details. Furthermore, the following embodiments and each detail thereof can be combined freely without departing the spirit and scope described in the attached claims.

According to an embodiment of the present invention, a method for acquiring node information is provided, which is adapted to optimize a Get command containing plural items in the device management protocol. Hereinafter, a process for setting a new status value for the Get command will be described firstly.

In the existing OMA DM protocol (Version 1.2 and earlier versions), 12 status values are defined for a Get command to indicate execution results of the command. These 12 status values are shown as FIG. 1, including: 200 (representing success), 404 (representing that a node can not be found), and etc.

It can be seen that the 12 status values illustrated as FIG. 1 can not represent the case that acquirement of partial nodes in all items in the Get command is successful while acquirement of partial nodes in all the items in the Get command fails. Therefore, a new status value is defined for the above case in the embodiment of the present invention, to represent the case that the execution of the Get command containing plural Items is partially successful (that is, it represents that the acquirement of the values of the nodes in partial items in the Get command fails).

In the embodiment of the present invention, the form of the definition of the status value is not limited. In practical application, a basic form of the new status value is the same as those of other status values, as long as the value of the new status value is set different from the existing status values. For example, the new status value in such case can be defined as 900, or 222. For convenience of description, the embodiment of the present invention will use 222 for indicating such case in the following description, which represents that an execution result of a Get command is "partially successful". It should be noted that the embodiment of the present invention is not limited to 222 as a response status value of the case.

Figure 3:
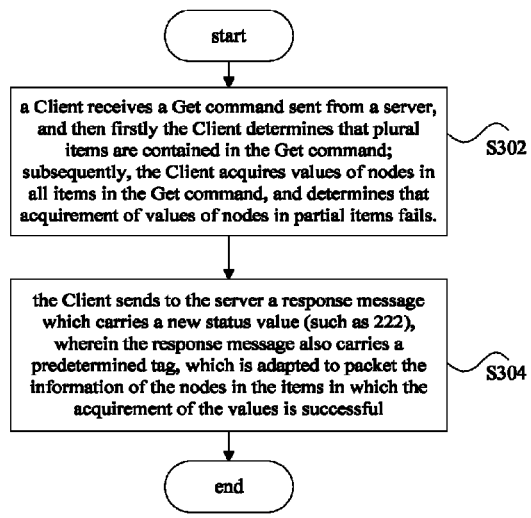
FIG. 3 is a flowchart of a method for acquiring node information according to an embodiment of the present invention.

After the new status value is set, the process illustrated as FIG. 3 can be executed. FIG. 3 is a flowchart of a method for acquiring node information according to an embodiment of the present invention, which includes the following steps.

Step S302, a Client receives a Get command sent from a server, and then firstly the Client determines that plural items are contained in the Get command; subsequently, the Client acquires values of nodes in all items in the Get command, and determines that acquirement of values of nodes in partial items fails.

Step S304, the Client sends to the server a response message which carries a new status value (such as 222), wherein the response message also carries a predetermined tag, which is adapted to packet the information of the nodes in the items in which the acquirement of the values is successful.

Specifically, after receiving such Get commands, the Client performs the operation of acquiring values of the nodes in each item in the received Get command. When the acquirement of the values of the nodes in one or more items fails, and the acquirement of the values of the nodes in some items is still successful, the status of the execution result of the Get command in the response message returned to the server by the Client should not be "Failed" but the new status value 222 as defined above. In the response message sent from the Client, a Result tag also should be contained, which carries the node information of correctly obtained values. The returned response message can be shown as follows:

```
<SyncML xmlns="SYNCML: SYNCML1.2">
<SyncHdr>
    <VerDTD>1.2</VerDTD>
    <VerProto>DM/1.2</VerProto>
    <SessionID>8155</SessionID>
    <MsgID>1</MsgID>
    ......omitted
</SyncHdr>
<SyncBody>
<Status>
    <CmdID>1</CmdID>
  <MsgRef>1</MsgRef>
    <CmdRef>1</CmdRef>
    <Cmd>Get</Cmd>
    <Data>222</Data>
  </Status>
<Results>
    <CmdID>1</CmdID>
    <MsgRef>1</MsgRef>
    <CmdRef>1</CmdRef>
<Item>
<Source>
    <LocURI>./DevInfo/Lang </LocURI>
    </Source>
    <Data>en-us</Data>
    </Item>
<Item>
<Source>
    <LocURI>./DevInfo/Man </LocURI>
    </Source>
    <Data>ZTE </Data>
    </Item>
  </Results>
<Final />
    </SyncBody>
</SyncML>
```

It can be seen from the above description that, by adopting the embodiment of the present invention, there are two obvious differences between the returned response message and the traditional response message. The first is that the status value is not 425 (or other "failed" message) but 222 (indicating the acquisition is successful, but not complete); the second is that, in the SyncBody, besides the description of the Status, the information of the two nodes in which the acquirement of the information is successful is added and sent to the server together.

Figure 4:
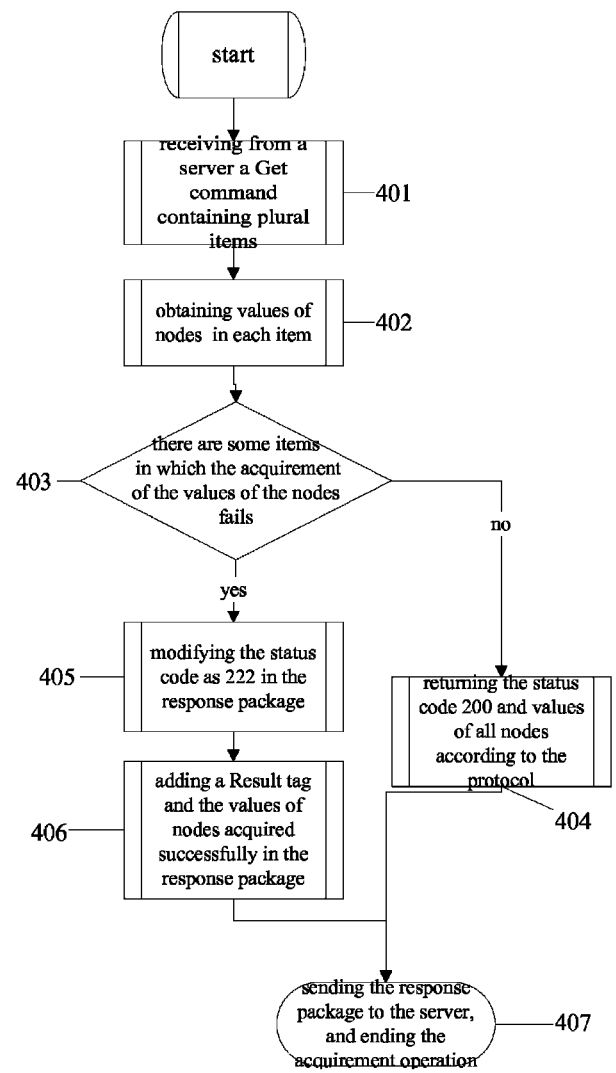
FIG. 4 is a flowchart of a process of a Client when receiving a Get command containing plural items according to an embodiment of the present invention.

The above technical solution will be described in detail in combination with the drawings hereinafter. FIG. 4 is a flowchart of a process of the Client when receiving a Get command containing plural items according to an embodiment of the present invention. As shown in FIG. 4, the flow includes the following processes.

Step 401, a Client receives a Get command sent from a server, and determines that the Get command contains plural Items.

Step 402, the Client calls local interfaces to acquire values of nodes in all Items.

Step 403, it is judged whether there are some items in which the acquirement of the values of the nodes fails, wherein if no, it enters Step 404; if it is determined that the acquirement of the values fails, it enters Step 405.

Step 404, the present step is a normal process flow in the current protocol. The Client packets a response message, and sets a status code as 200 to indicate that the execution of the Get command is successful. After the execution is completed, it enters Step 407.

Step 405, the present step is specifically designed by the present invention, in which after determining that the acquirement of the values of the nodes in some items fails, the Client sets the status code as 222 when packeting the response message.

Step 406, the Client continues to add a Result tag in the response package, and packets the nodes with the successful value acquirement according to the protocol and criterion.

Step 407, the Client sends the response package to the server, and ends the process flow of the Get command.

Through the above mentioned process, the Client can carry the new status value in the response message to notify the server that the acquirement of the values of the nodes in partial items fails. An operation of the server after receiving the response message will be described hereinafter.

After the Step S304, the server is required to perform a response process on the response message, which includes the following operations.

1. The server receives the response message, and determines that the response message carries the new status value.

2. The server acquires node information from a predetermined tag (namely, a Result tag), and stores the node information.

3. The server executes a predetermined operation for the nodes in the items in which the acquirement of the values fails. The predetermined operation includes one of the following: giving up a session with the nodes in the items in which the acquirement of the values fails, and resending a Get command to acquire the values of the nodes in the items in which the acquirement of the values fails.

Specifically, after receiving the response message sent from the above mentioned Client, the server can determine that the execution result of the Get command is partial success of the acquirement according to the status code 222. Subsequently, the server will judge which nodes are acquired successfully and which nodes are not acquired successfully, according to the Items in the Result tag. The nodes acquired successfully are stored by the server. As to the nodes acquired un-successfully, the server can choose to give up the session, or resend a Get command separately for acquiring.

Figure 5:
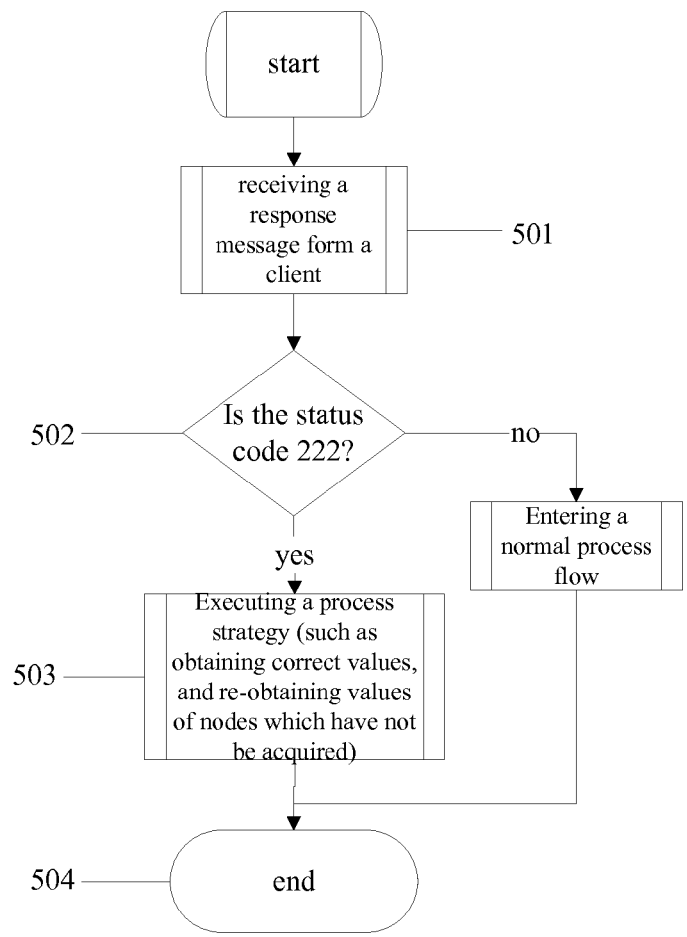
FIG. 5 is a flowchart of a process of a server when receiving a response message which carries a new status value according to an embodiment of the present invention.

The operations of the server will be described in detail in combination with the drawings hereinafter. FIG. 5 is a flowchart of a process of a server when receiving a response message which carries a new status value according to an embodiment of the present invention. As illustrated in FIG. 5, the flow includes the following processes.

Step 501, the server receives a response message sent from a Client.

Step 502, the server judges whether the status code in the response message is 222, wherein if no, it performs a normal process flow, and enters the Step 504; and if yes, it executes the Step 503.

Step 503, after the status code is determined to be 222, a process strategy is executed, which includes: storing correctly acquired values, and retrying a Get command for the values that have not been acquired, and etc., wherein the values of the nodes in the items which are not acquired can be retried or given up.

Step 504, the session is ended.

Through the above mentioned processes, the server can acquire useful nodes more effectively, and locate the nodes which can not be acquired.

Device Embodiment 1

Figure 6:
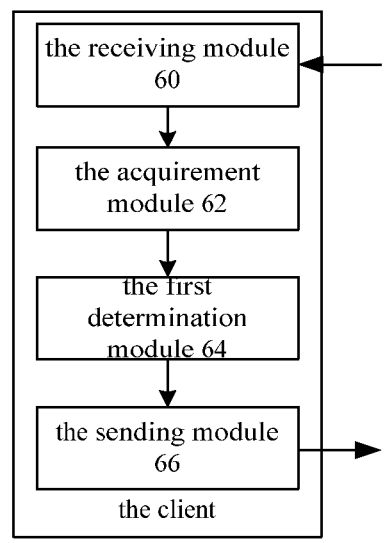
FIG. 6 is a block diagram of a Client according to an embodiment of the present invention.

According to an embodiment of the present invention, a Client is provided for optimizing a Get command containing plural items in the device management protocol. FIG. 6 is a block diagram of a Client according to an embodiment of the present invention. As illustrated in FIG. 6, the Client according to the embodiment of the present invention includes: a receiving module 60, an acquirement module 62, a first determination module 64, and a sending module 66. The Client according to the embodiment of the present invention will be described in detail hereinafter.

It needs to be noted that, before the following processes are performed, a new status value is required to be defined for indicating the case that the execution of a Get command containing plural Items is partially successful (that is, it indicates that the acquirement of the values of the nodes in partial items in a Get command fails).

The form of the definition of the status value is not limited in the embodiment of the present invention. In practical application, a basic form of the new status values is the same as those of other status values, as long as the value of the new status value is set different from the existing status values. For example, the new status value in such case can be defined as 900, or 222. For convenience of description, the embodiment of the present invention will use 222 for indicating such case in the following description, which represents that an execution result of a Get command is "partially successful". It needs to be noted that the embodiment of the present invention is not limited to specifying 222 as a response status value of the status.

The Client according to the embodiment of the present invention will be described hereinafter.

Specifically, the receiving module 60 is adapted to receive a Get command sent from a server. After the receiving module 60 receives the Get command sent from the server, the second determination module is required to determine that plural items are contained in the Get command; and then the acquirement module 62 acquires values of nodes in all items in the Get command. After the acquirement module 62 acquires the values of the nodes in all items in the Get command, the first determination module 64 determines that acquirement of values of nodes in partial items fails; and subsequently, the sending module 66 sends to the server a response message which carries a new status value indicating that acquirement of values of nodes in partial items fails when the Get command is executed, wherein the response message also carries a predetermined tag which is adapted to packet information of nodes in items in which acquirement of values is successful.

In the above, the returned response message can be described as follows.

```
<SyncML xmlns="SYNCML: SYNCML1.2">
<SyncHdr>
    <VerDTD>1.2</VerDTD>
    <VerProto>DM/1.2</VerProto>
    <SessionID>8155</SessionID>
    <MsgID>1</MsgID>
    ......omitted
</SyncHdr>
<SyncBody>
<Status>
    <CmdID>1</CmdID>
  <MsgRef>1</MsgRef>
    <CmdRef>1</CmdRef>
    <Cmd>Get</Cmd>
    <Data>222</Data>
</Status>
<Results>
    <CmdID>1</CmdID>
    <MsgRef>1</MsgRef>
    <CmdRef>1</CmdRef>
```

-continued

```
<Item>
<Source>
    <LocURI>./DevInfo/Lang </LocURI>
    </Source>
    <Data>en-us</Data>
</Item>
<Item>
<Source>
    <LocURI>./DevInfo/Man </LocURI>
    </Source>
    <Data>ZTE </Data>
</Item>
</Results>
<Final />
    </SyncBody>
</SyncML>
```

It can be seen from the above description that, by adopting the embodiment of the present invention, there are two obvious differences between the returned response message and the traditional response message. The first is that the status value is not 425 (or other messages of failure) but 222 (indicating the acquirement is successful, but not complete); and the second is that, in the SyncBody, besides the description of the Status, the information of the two nodes in which the acquirement of the information is successful is added and sent to the server together.

Device Embodiment 2

Figure 7:
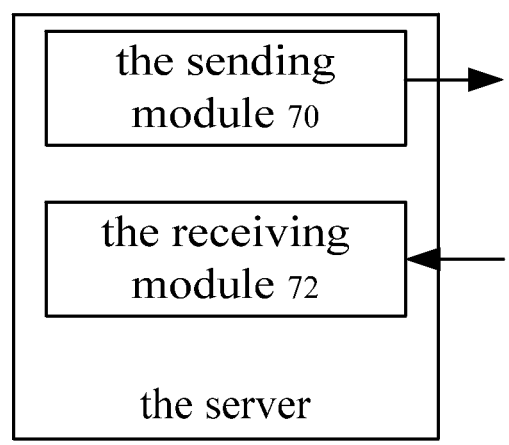
FIG. 7 is a block diagram of a server according to an embodiment of the present invention.

According to an embodiment of the present invention, a server is provided for optimizing a Get command containing plural items in the device management protocol. FIG. 7 is a block diagram of a server according to an embodiment of the present invention. As shown in FIG. 7, the server according to the embodiment of the present invention includes: a sending module 70 and a receiving module 72. The server according to the embodiment of the present invention will be described in detail hereinafter.

It needs to be noted that, before the following process is performed, a new status value is required to be defined for indicating the case that the execution of a Get command containing plural Items is partially successful (that is, it indicates that the acquirement of the values of the nodes in partial items in a Get command fails).

The form of the definition of the status value is not limited in the embodiment of the present invention. In practical application, a basic form of the new status value is the same as those of other status values, as long as the value of the new status value is different from the existing status values. For example, the new status value in such case can be defined as 900, or 222. For convenience of description, the embodiment of the present invention will use 222 for indicating such case in the following description, which represents that an execution of a Get command is "partially successful". It needs to be noted that the embodiment of the present invention is not limited to 222 as a response status value of the status.

The server according to the embodiment of the present invention will be described hereinafter.

Specifically, the sending module 70 is adapted to send the Get command to a Client; and the receiving module 72 is adapted to receive, from the Client, a response message which carries a new status value indicating that acquirement of values of nodes in partial items fails when the Get command is executed, wherein the response message carries the predetermined tag which is adapted to packet information of the nodes in items in which acquirement of values is successful.

After the receiving module 72 receives the response message sent from the Client, a determination module will determine that the response message carries the new status value. If the response message carries the new status value, a storage module therein will acquire the node information according to the predetermined tag, and store the node information. Subsequently, an execution module executes a predetermined operation for the nodes in the items in which the acquirement of the values fails. The operation of the execution module includes one of the following: giving up a session with the nodes in the items in which the acquirement of the values fails; and resending a Get command to acquire the values of the nodes in the items in which the acquirement of the values fails.

It needs to be noted that the above individual modules can be variously modified and combined with each other, without departing the spirit and scope illustrated in the attached claims.

In conclusion, in virtue of the technical solution of the present invention, when a Get command, containing plural Items, of the OMA SyncML DM is executed, the Client can notify the server through a special status value that the Get is not completely successful but partially successful, and that the values of the nodes which are successfully acquired are attached in the Result tag, so as to solve the problem in the related art that the rest acquired effective information can not take effect when one or more Items in a Get command fails, therefore acquiring useful nodes more effectively, locating nodes that can not be acquired, improving the effectiveness with which the Client operates a Get command, and avoiding the case that network resources are wasted.

Apparently, those skilled in the art should understand that each above mentioned module or each above mentioned step of the present invention can be realized through general computing devices; they can be integrated on a single computing device or distributed in a network composed of plural computing devices; selectively, they can be realized through programming codes that computing devices can execute; therefore, they can be stored in storage devices to be executed by computing devices, or each of them can be manufactured separately as single integrated circuit module, or plural modules or steps of them can be manufactured as single integrated circuit module. Therefore, the present invention is not limited to any certain combination of hardware and software.

The above mentioned are just preferred embodiments of the present invention, and should not be used to limit the present invention. As for those skilled in the art, the present invention can have various modifications and variations. Any modifications, equivalent replacement, improvements, and etc. within the spirit and principles of the present invention should be included in the protection scope of the present invention.

What is claimed is:

1. A method for acquiring node information, which is adapted to optimize a Get command, which contains a plurality of items, in a device management protocol, comprising:
    receiving, by a Client, the Get command sent from a server, attempting to acquire by the Client values of nodes of the plurality of items in the Get command, and determining by the Client that acquirement of values of nodes in a subset of the plurality of items fails; and
    sending, by the Client, to the server a response message which carries a new status value, which indicates that acquirement of values of nodes in a subset of the plurality of items fails when a Get command is executed, and the response message also carries a predetermined tag, wherein the predetermined tag which packets the information of the nodes in items in which acquirement of values is successful.

2. The method according to claim 1, wherein before the step of the Client receiving the Get command sent from the server, the method further comprises:
    setting the new status value for the Get command, which indicates that the acquirement of the values of the nodes in partial items fails.

3. The method according to claim 2, wherein after the step of the Client receiving the Get command sent from the server, the method further comprises:
    the Client determining that a plurality of items are contained in the Get command.

4. The method according to claim 3, wherein after the step of the Client sending to the server the response message, the method further comprises:
    the server receiving the response message and determining that the response message carries the new status value;
    the server acquiring, from the predetermined tag, the information of nodes of the items in which the acquirement of the values is successful, and storing the information of nodes; and
    the server executing a predetermined operation for the nodes of the items in which the acquirement of the values fails.

5. The method according to claim 4, wherein the predetermined operation comprises one of the following:
    giving up a session with the nodes of the items in which the acquirement of the values fails; and
    resending a Get command to acquire the values of the nodes of the items in which the acquirement of the values fails.

6. A Client, which is adapted to optimize a Get command, which contains a plurality of items, in a device management protocol, wherein the Client comprises a hardware processor, which executes a receiving module, an acquirement module, a first determination module and a sending module, wherein:
    the receiving module is adapted to receive the Get command sent from a server;
    the acquirement module is adapted to attempt to acquire values of nodes of the plurality of items in the Get command;
    the first determination module is adapted to determine that acquirement of values of nodes in a subset of the plurality of items fails; and
    the sending module is adapted to send to the server a response message which carries a new status value indicating that acquirement of values of nodes in a subset of the plurality of items fails when a Get command is executed, wherein the response message also carries a predetermined tag, wherein the predetermined tag which packets the information of nodes in items in which acquirement of values is successful.

7. The Client according to claim 6, wherein the hardware processor further executes a second determination module, wherein:
    the second determination module is adapted to determine that a plurality of items are contained in the Get command.

8. A server, which is adapted to optimize a Get command, which contains a plurality of items, in a device management protocol, wherein the server comprises a hardware processor, which executes a sending module, a receiving module, wherein:
    the sending module is adapted to send the Get command to a Client; and the receiving module is adapted to receive, from the Client, a response message which carries a new status value indicating that attempt to acquire values of nodes of a subset of the plurality of items fails when a Get command is executed; wherein the response message also carries a predetermined tag, wherein the predetermined tag which packets the information of nodes in items in which acquirement of values is successful.

9. The server according to claim 8, wherein the hardware processor further executes a determination module, a storage module, an execution module, wherein:

the determination module is adapted to determine that the response message carries the new status value;

the storage module is adapted to acquire, according to the predetermined tag, the information of nodes of the items in which the acquirement of the values is successful, and store the information of nodes; and the execution module is adapted to execute a predetermined operation for the nodes of the items in which the acquirement of the values fails.

10. The server according to claim 9, wherein the execution module is adapted to execute one of the following predetermined operations:

giving up a session with the nodes in the items in which the acquirement of the values fails; and resending a Get command to acquire the values of the nodes in the items in which the acquirement of the values fails.

* * * * *